United States Patent
Gwaltney

(10) Patent No.: US 12,043,460 B2
(45) Date of Patent: Jul. 23, 2024

(54) ANTIMICROBIAL DETECTABLE CABLE TIE WITH ONE OR MORE METALLIC BARBS

(71) Applicant: ABB Schweiz AG, Baden (CH)

(72) Inventor: Jonathan J. Gwaltney, Memphis, TN (US)

(73) Assignee: ABB SCHWEIZ AG, Baden (CH)

( * ) Notice: Subject to any disclaimer, the term of this patent is extended or adjusted under 35 U.S.C. 154(b) by 141 days.

(21) Appl. No.: 17/804,263

(22) Filed: May 26, 2022

(65) Prior Publication Data

US 2023/0382615 A1  Nov. 30, 2023

(51) Int. Cl.
| | | |
|---|---|---|
| *B65D 63/10* | (2006.01) | |
| *A01N 59/16* | (2006.01) | |
| *A01N 59/20* | (2006.01) | |

(52) U.S. Cl.
CPC ......... *B65D 63/1036* (2013.01); *A01N 59/16* (2013.01); *A01N 59/20* (2013.01)

(58) Field of Classification Search
CPC .... B65D 63/1036; A01N 59/16; A01N 59/20; A01P 1/00
See application file for complete search history.

(56) References Cited

U.S. PATENT DOCUMENTS

| | | | | |
|---|---|---|---|---|
| 3,588,961 A | * | 6/1971 | Farago | B65D 63/1054 24/16 PB |
| 5,513,421 A | * | 5/1996 | Wells | B65D 63/1036 24/30.5 P |
| 7,067,185 B2 | * | 6/2006 | Ausen | A44B 18/0092 428/100 |
| 7,871,693 B2 | | 1/2011 | Laporte et al. | |
| 10,138,038 B2 | | 11/2018 | Gao | |
| 2012/0266417 A1 | * | 10/2012 | Browne | F16L 3/2332 24/16 R |
| 2016/0130054 A1 | * | 5/2016 | Gao | B65D 63/1027 264/331.12 |

FOREIGN PATENT DOCUMENTS

| | | |
|---|---|---|
| EP | 2952094 A1 | 12/2015 |
| EP | 3017669 B1 | 7/2020 |

OTHER PUBLICATIONS

Hamdan, S. et al., (2017). Nanotechnology-Driven Therapeutic Interventions in Wound Healing: Potential Uses and Applications. ACS central science, 3(3), 163-175.

Botes, M., & Cloete, T. E. (2010). The potential of nanofibers and nanobiocides in water purification. Critical reviews in microbiology, 36(1), 68-81.

* cited by examiner

*Primary Examiner* — Robert Sandy
(74) *Attorney, Agent, or Firm* — Greenberg Traurig, LLP

(57) ABSTRACT

A cable tie includes a body having a composition wherein the composition includes a base plastic, an antimicrobial additive, and a detectable additive selected from a detectable metal additive, an X-ray detectable additive, and combinations thereof, a head having a bard including a metallic barb material, and wherein the body and the head are integrally formed. The antimicrobial additive can be configured to be resistant against silver-ion resistant pathogens. The antimicrobial additive can include complexes of zinc, copper, other metallic ions, and combinations thereof.

18 Claims, 1 Drawing Sheet

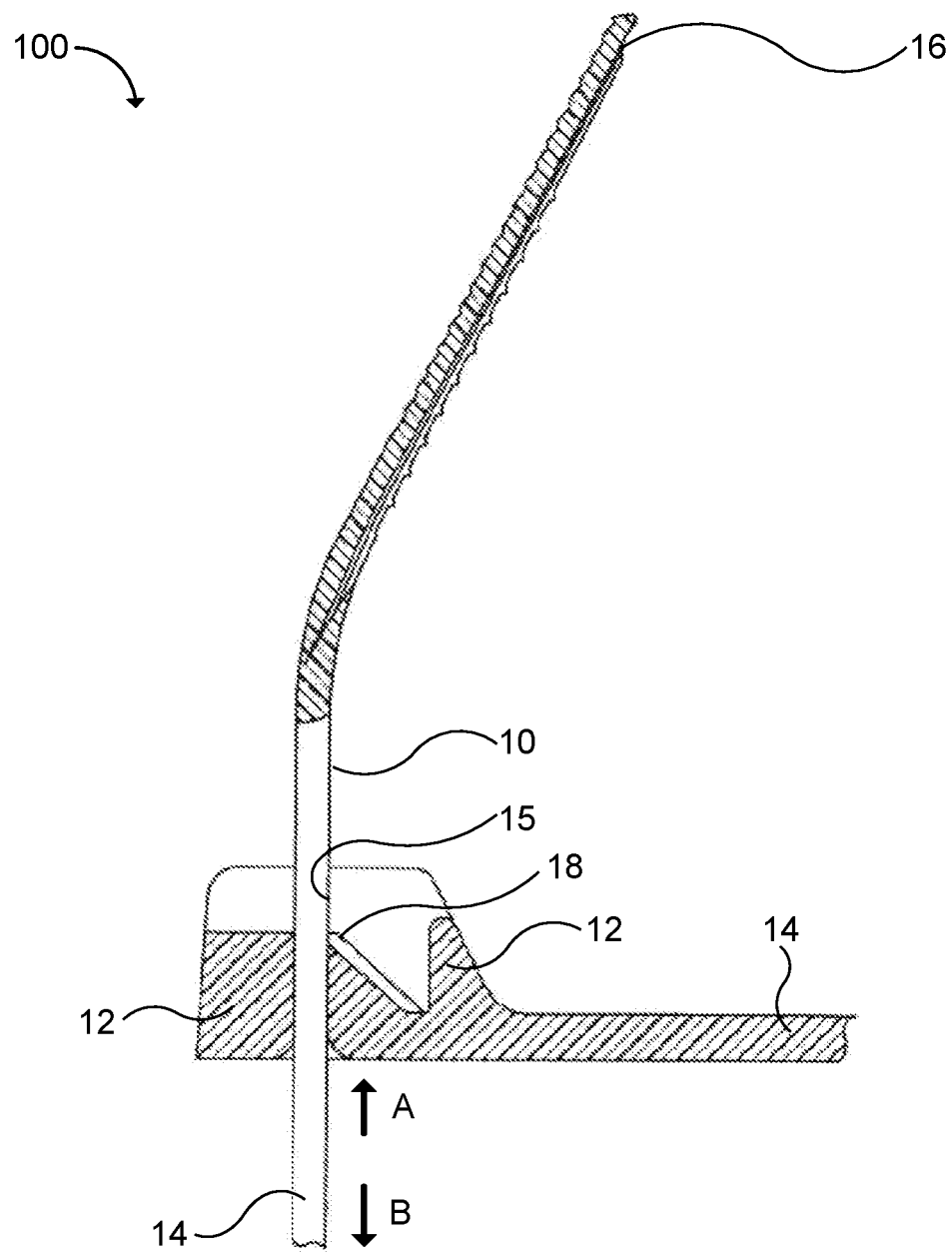

ANTIMICROBIAL DETECTABLE CABLE TIE WITH ONE OR MORE METALLIC BARBS

FIELD

The present disclosure relates to the field of cable ties, specifically plastic cable ties having an antimicrobial additive resistant to silver resistant bacteria.

BACKGROUND

Cable ties are well known and may be used to bundle or secure groups of elongate members, such as electrical wires or cables. Typically, cable ties include a head, an elongate tail, and a longitudinal strap therebetween. The head of the cable tie includes a locking element which is engageable with the strap to secure the strap in the head. The locking element further can include a metallic barb embedded in the head which secures the strap in the head.

In food processing and clinical settings, existing polyamide 6,6, and polypropylene cable ties can include an antimicrobial additive to resist bacterial and fungal growth, where different types of bacteria and/or fungi may be introduced to the surfaces of cable ties by exposure, such as by direct contract and/or air. However, the use of typical antimicrobial additives has led to the propagation of antimicrobial resistant pathogens. Thus, cable ties that exhibit improved antimicrobial properties are desirable.

SUMMARY

Some embodiments of the present disclosure relate to cable ties having antimicrobial properties that exhibit resistance to silver resistant bacteria and provide detectability and/or metal detectability. In particular, the cable ties include a composition have a base plastic, an antimicrobial additive, and a detectable additive selected from a detectable metal additive, an X-ray detectable additive, and combinations thereof.

In some embodiments, a cable tie includes a body having a composition wherein the composition includes: a base plastic, an antimicrobial additive comprising a complex of zinc, copper, other metallic ions, and combinations thereof, wherein the antimicrobial additive is configured to be effective against silver ion resistant pathogens, and a detectable additive selected from a detectable metal additive, an X-ray detectable additive, and combinations thereof; and a head having a barb including a metallic barb material, wherein the body and the head are integrally connected.

In some embodiments, the base plastic is polyamide, polypropylene, polycarbonate, poly(ethylene tetrafluoroethylene), polyetheretherketone, poly(ethylene and chlorotrifluoroethylene), polyvinyl chloride, or a combination of two or more thereof.

In some embodiments, the antimicrobial additive includes between 0.1% to 30% by weight of the composition.

In some embodiments, the antimicrobial additive includes between 2% to 15% by weight of the composition.

In some embodiments, the antimicrobial additive includes between 2% to 5% by weight of the composition.

In some embodiments, the antimicrobial additive includes zinc oxide.

In some embodiments, the antimicrobial additive does not include zinc pyrithione.

In some embodiments, the detectable additive includes a detectable metal additive, wherein the detectable metal additive includes between 0.3% to 25% by weight of the composition.

In some embodiments, the detectable additive includes an X-ray detectable additive, wherein the X-ray detectable additive includes between 0.5% to 15% by weight of the composition.

In some embodiments, the composition further includes a colorant.

In some embodiments, the metallic barb material includes stainless steel, and wherein the barb further comprises a first metallic barb and a second metallic barb.

In some embodiments, a device for bundling a plurality of elongate members in parallel relation, the device includes a body having a composition wherein the composition includes: a base plastic, an antimicrobial additive comprising a complex of zinc, copper, other metallic ions, and combinations thereof and configured to be effective against silver ion resistant pathogens, a detectable metal additive, and an X-ray detectable additive; a head integrally connected to the body; wherein the head includes a barb including a metallic barb material for receiving an opposite end of the body in inverse frictional relation to bundle the plurality of elongate members.

In some embodiments, the antimicrobial additive includes zinc oxide.

In some embodiments, the antimicrobial additive does not include zinc pyrithione.

In some embodiments, the antimicrobial additive includes between 0.1% to 30% of the composition.

In some embodiments, the antimicrobial additive includes between 2% to 15% of the composition.

In some embodiments, the antimicrobial additive includes between 2% to 5% of the composition.

In some embodiments, the metallic barb material includes stainless steel, and wherein the barb further comprises a first metallic barb and a second metallic barb.

In some embodiments, the base plastic is polyamide, polypropylene, polycarbonate, poly(ethylene tetrafluoroethylene), polyetheretherketone, poly(ethylene and chlorotrifluoroethylene), polyvinyl chloride, or a combination thereof.

In some embodiments, the detectable metal additive includes between 0.3% to 25% by weight of the composition, and wherein the X-ray detectable additive includes between 0.5% to 15% by weight of the composition.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIG. 1 shows, in section, a cable tie having a cable tie head and extending strap, with the strap inserted into the head, according to some embodiments.

DETAILED DESCRIPTION

Among those benefits and improvements that have been disclosed, other objects and advantages of this disclosure will become apparent from the following description taken in conjunction with the accompanying FIGURES. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in some embodiments," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise.

In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or
- any combination(s) thereof.

As used herein "embedded" means that a first material is distributed throughout a second material.

Referring to FIG. 1, a cable tie 100 of the present invention is shown. Cable tie 100 is typically an elongate molded plastic member which is used in a manner well known in the art to wrap around a bundle of articles (not shown). Cable tie 100 includes a body 10, the body 10 including a composition that includes a base plastic, an antimicrobial additive, and a detectable additive selected from a detectable metal additive, an X-ray detectable additive and combinations thereof, which in certain embodiments, is suitable for use with food and food grade materials. Cable tie 100 has a head 12 at one end thereof, a tail 16 at the other end of the head 12 and a generally planar strap 14 therebetween. In the illustrative embodiment provided, head 12 is formed as an integral portion of cable tie 100. However, in certain applications cable tie 100 may be constructed in a manner where head 12 is formed separately from strap 14.

Head 12 of cable tie 100 includes an aperture 15 extending therethrough (shown with strap 14 therein) for insertably accommodating the tail 16 and passage of the strap 14 therein in a first direction "A". Head 12 of cable tie 100 includes a locking device 18 supported by the head 12 and extending into the aperture 15. The locking device permits movement of the strap 14 in the first direction "A" and prevents substantial movement of the strap 14 in a second direction "B" opposite the first direction "A" upon an attempt to withdraw the strap 14 from the aperture. In some embodiments, the body 10 and the head 12 can be integrally connected. In some embodiments, the head 12 can include a metallic barb 18 comprising a metallic material for receiving an opposite end of the body 10 in inverse frictional relation to bundle a plurality of elongate members. The locking device may include a metallic barb such as shown in U.S. Pat. No. 5,513,421; or an integrally formed plastic pawl such as shown in U.S. Pat. No. 7,017,237.

Suitable base plastics include, but are not limited to, polyamide (e.g., nylon), polypropylene, polycarbonate, poly (ethylene tetrafluoroethylene), polyetheretherketone, poly (ethylene and chlorotrifluoroethylene), polyvinyl chloride and combinations of two or more thereof. In some embodiments, the base plastic is polypropylene. In some embodiments, the base plastic is polyamide. In some embodiments, the base plastic is polyamide 6 (i.e., nylon 6). In some embodiments, the base plastic is polyamide 6,6 (i.e., nylon 6,6). In some embodiments, polyamide 6,6 is a medium impact modified compound with embedded process aid. As is well known to a skilled artisan, the amount of base plastic in the composition can be varied, depending on the other ingredients employed in the composition.

Suitable antimicrobial additives can include, but are not limited to, zinc ion complexes, magnesium ion complexes, copper ion complexes, and combinations thereof. In some embodiments, the antimicrobial additive can contain one type of metallic ion complex. In some embodiments, the antimicrobial additive can contain more than one type of metallic ion complex. In some embodiments, the antimicrobial additive can include complexes of zinc, copper, other metallic ions, and combinations thereof. In some embodiments, the antimicrobial additive does not include zinc pyrithione derivative. In some embodiments, the antimicrobial additive includes complexes of zinc, copper, other metallic ions, and combinations thereof and does not include zinc pyrithione derivative. In some embodiments, the antimicrobial additive can be configured to be effective against silver ion resistant pathogens as will be further discussed below.

In some embodiments, the antimicrobial additive can be zinc oxide. In some embodiments, the antimicrobial additive can include zinc oxide and at least one metallic ion complex selected from the group of copper ion complexes, magnesium ion complexes, and/or other metallic ion complexes. In some embodiments, the antimicrobial additive includes zinc oxide and does not include zinc pyrithione derivative.

The antimicrobial additive makes up between 0.1% to 30% by weight of the composition. In some embodiments, the antimicrobial additive makes up between 1% to 30% by weight of the composition. In some embodiments, the antimicrobial additive makes up between 2% to 30% by weight of the composition. In some embodiments, the antimicrobial additive makes up between 5% to 30% by weight of the composition. In some embodiments, the antimicrobial additive makes up between 10% to 30% by weight of the composition. In some embodiments, the antimicrobial additive makes up between 15% to 30% by weight of the composition. In some embodiments, the antimicrobial additive makes up between 20% to 30% by weight of the composition. In some embodiments, the antimicrobial additive makes up between 0.1% to 25% by weight of the composition. In some embodiments, the antimicrobial additive makes up between 0.1% to 20% by weight of the composition. In some embodiments, the antimicrobial additive makes up between 0.1% to 15% by weight of the composition. In some embodiments, the antimicrobial additive makes up between 0.1% to 10% by weight of the composition. In some embodiments, the antimicrobial additive makes up between 0.1% to 5% by weight of the composition. In some embodiments, the antimicrobial additive makes up between 1% to 5% by weight of the composition. In some embodiment, the antimicrobial additive makes up between 2% to 15% by weight of the composition. In some embodiment, the antimicrobial additive makes up between 2% to 5% by weight of the composition. For example, in one embodiment, the antimicrobial additive is a complex of zinc, copper, and/or other metallic ions and makes up 3% by weight of the composition. As is well known to a skilled artisan, the amount of antimicrobial additive in the composition can be varied, depending on the antimicrobial additive selected and/or other ingredients employed, so as to provide antibacterial properties to the resultant cable tie.

Complexes of zinc, copper, other metallic ions, and combinations thereof exhibit antimicrobial activity against both Gram-positive and gram-negative bacteria and exhibits antimicrobial activity against spores. Further, it is believed that complexes of zinc, copper, and/or other metallic ions may involve the production of reactive oxygen species, including superoxide anions, hydrogen peroxide, and hydroxide, which can elevate membrane lipid peroxidation and can cause cellular component destruction due to their internalization into the bacterial cell membrane, thereby resulting in cell death. Complexes of zinc, copper, other metallic ions, and combinations thereof can further resist antimicrobial activity by remaining firmly absorbed at the surface of the killed bacteria.

In some embodiments, the antimicrobial additives does not include zinc pyrithione. It is believed that zinc pyrithione increases the cellular levels of heavy metals, damaging clusters of proteins essential for pathogen metabolism. Consequently, zinc pyrithione can be used in combination with other metallic antimicrobial compounds to resist the growth of pathogens. However, prolonged use of such compounds has led to the propagation of pathogens resistant to certain antimicrobial additives including silver ion complexes.

Suitable detectable metal additives include, but are not limited to, ferrous metal particles, non-ferrous metal particles and combinations of two or more thereof. In some embodiments, the detectable metal additive is iron particles. Iron particles, other ferrous metal particles and/or non-ferrous particles can have various shapes (e.g., spherical shape, flake shape or other irregular shapes). The particle size of detectable metal additives can range from between 100 μm to 500 μm. Detectable metal additives make up between 0.3% to 25% by weight of the composition. For example, in one embodiment, the detectable metal additive is iron particles having a particle size range of from 150 μm to 200 μm and makes up 15% by weight of the composition. As is well known to a skilled artisan, the amount of detectable metal additive in the composition can be varied, depending on shape and size of particles thereof, to provide metal detectability to the resultant cable tie.

Suitable X-ray detectable additives include, but are not limited to, iodine, barium based salt and combinations of two or more thereof. In some embodiments, the X-ray detectable additive is barium sulfate. In some embodiments, the X-ray detectable additive makes up between 0.5% to 15% by weight of the composition. For example, in one embodiment, the X-ray detectable additive is barium sulfate powder loaded at between 3% by weight of the composition. As is well known to a skilled artisan, the amount of X-ray detectable additive in the composition can be varied, depending on other ingredients, to provide X-ray detectability to the resultant cable tie.

In some embodiments, the cable tie 100 further includes a metallic barb 18. In some embodiments, the locking device can further include the metallic barb 18. In some embodiments, the cable tie 100 can further include more than one metallic barb 18. In some embodiments, the cable tie can include a first metallic barb 18' and a second metallic barb 18" disposed adjacent to the first metallic barb 18' to lock the strap 14 in the head 12. The metallic barb 18 can be made of a metallic material. In some embodiments, the metallic material can include stainless steel.

In some embodiments, the composition further includes a colorant. A skilled artisan can readily select a colorant compatible with the composition. In some embodiments, the colorant makes up between 0.5% to 10% by weight of the composition. As is well known to a skilled artisan, the amount of colorant in the composition can be varied, depending on other ingredients, to color the resultant cable tie.

In some embodiments, the detectable additive can include a combination of a detectable metal additive and an X-ray detectable additive. In one such embodiment, the detectable metal additive is iron particles, and the X-ray detectable additive is barium sulfate.

In some embodiments, the base plastic is polyamide 6,6, the antimicrobial additive is a complex of zinc, copper, other metallic ions, and combinations thereof, the detectable additive includes a combination of a detectable metal additive and an X-ray detectable additive, wherein the detectable metal additive is iron particles and the X-ray detectable additive is barium sulfate. For example, in one such embodiment, the base plastic is polyamide 6,6 and makes up 77% by weight of the composition, the complexes of zinc, copper, other metallic ions, and combinations thereof make up 2% by weight of the composition, the iron particles have a size range of 150 μm to 200 μm and makes up 10% by weight of the composition, the barium sulfate makes up 3% by weight of the composition, and a blue colorant makes up 8% by weight of the composition.

In some embodiments, any of the aforementioned cable ties of the present invention is treated with a sanitizing chemical to inhibit antimicrobial (e.g., bacterial and/or fungal) growth. For example, the sanitizing chemical can be applied once, daily, every other day or as deemed necessary to inhibit antimicrobial growth. In some embodiments, a cable tie of the present application is sanitized with 0.5% sodium hyperchlorite aqueous solution (widely used in hospital environments as a cleaning agent), for example, every other day. As is well known to a skilled artisan, sterilization procedures compatible for cleaning detectable plastic cable ties may be employed so as to minimize bacterial and/or fungal growth.

In general, methods of preparing cable ties are provided which include (a) mixing ingredients including a base plastic, an antimicrobial additive, and a detectable additive selected from a detectable metal additive, an X-ray detectable additive and combinations thereof; (b) melting the mixture at a temperature that is between 1 and 30° C. above the melting point of the base plastic to form a molten material therefrom and (c) molding the cable tie from the molten material. Technology that forms such composition is well known to a skilled artisan. Likewise, molding process technology for cable tie products is well known to a skilled artisan.

More specifically, the present invention provides methods of preparing a cable tie including mixing the ingredients (including a base plastic, an antimicrobial additive, and a detectable additive selected from a detectable metal additive, an X-ray detectable additive and combinations thereof) mechanically, followed by a heated melting process that undergoes further pressurized mechanical mixing to form a molten mixture wherein the temperature is controlled at between 1 and 30° C. above the melting point of the base plastic. The molten mixture is then pressed flowing into a steel mold, forming a cable tie shape. The plastic part is cooled down to yield a cable tie exhibiting both antimicrobial properties and metal and/or X-ray detectable properties.

Though not meant to be limited by any theory with the subject invention, it is believed that incorporation of an antimicrobial additive in a composition (having at least one detectable additive therein) from which a cable tie is molded provides antimicrobial properties thereto that exhibits resistance to silver-ion resistant pathogens including microbial organisms and fungi. Further, it is believed that such cable ties exhibit reduced surface stain and odor caused by bacteria and/or fungus. Further, it is believed that such cable ties reduce the possibility of microbial (e.g., bacterial and/or fungal) contamination when the cable ties are contacted with or exposed to a food, a food ingredient, or an individual.

As is well known to a skilled artisan, metal detectability of a cable tie can be tested using a metal detector. In some embodiments, a metal detecting device is able to detect a cable tie of the present invention at a setting of 0.170 cm/ferrous sphere.

As is well known to a skilled artisan, X-ray detectability of a cable tie can be tested using an X-ray detector. In some embodiments, an X-ray detecting device (e.g., Eagle FA detector from Smith-Heimann) is able to detect the presence of a cable tie of the present invention.

As is well known to a skilled artisan, antimicrobial properties of a cable tie of the present invention can be ascertained by measuring growth of a representative microbe thereon following incubation under conditions conducive to microbial growth as compared with a similarly treated conventional cable tie (i.e., lacking an antimicrobial additive). In some embodiments, a cable of the present invention is subjected to an antimicrobial test following either JIS Z2801 or ISO 22196 testing standard for representative bacteria. Desirably, a cable tie of the present invention will exhibit a >99% reduction of *Escherichia coli* and >99% reduction of *Staphylococcus aureus*. In another embodiment, a cable tie of the present invention exhibits the aforementioned antimicrobial activity and further exhibits favorable aging under accelerated aging conditions. For example, accelerated aging conditions for a polyamide 6,6-based antimicrobial cable tie are 60° C. and 50% relative humidity for 54 days, equating to two years of regular application at normal atmosphere.

It will be appreciated by those skilled in the art that changes could be made to the embodiments described above without departing from the broad inventive concept thereof. It is understood, therefore, that this invention is not limited to the particular embodiments disclosed but is intended to cover modifications that are within the spirit and scope of the invention, as defined by the appended claims.

What is claimed is:

1. A cable tie comprising:
    a body having a composition wherein the composition includes:
        a base plastic,
        an antimicrobial additive comprising a complex of zinc and copper,
        wherein the antimicrobial additive does not include zinc pyrithione, and
        wherein the antimicrobial additive is configured to be effective against silver ion resistant pathogens, and
        a detectable additive selected from a detectable metal additive, an X-ray detectable additive, and combinations thereof; and
    a head having a barb comprising a metallic barb material, wherein the body and the head are integrally connected.

2. The cable tie of claim 1, wherein the base plastic is polyamide, polypropylene, polycarbonate, poly(ethylene tetrafluoroethylene), polyetheretherketone, poly(ethylene and chlorotrifluoroethylene), polyvinyl chloride, or a combination of two or more thereof.

3. The cable tie of claim 1, wherein the antimicrobial additive comprises between 0.1% to 30% by weight of the composition.

4. The cable tie of claim 3, wherein the antimicrobial additive comprises between 2% to 15% by weight of the composition.

5. The cable tie of claim 4, wherein the antimicrobial additive comprises between 2% to 5% by weight of the composition.

6. The cable tie of claim 1, wherein the antimicrobial additive comprises zinc oxide.

7. The cable tie of claim 1, wherein the detectable additive includes a detectable metal additive,
    wherein the detectable metal additive comprises between 0.3% to 25% by weight of the composition.

8. The cable tie of claim 1, wherein the detectable additive includes an X-ray detectable additive,
    wherein the X-ray detectable additive comprises between 0.5% to 15% by weight of the composition.

9. The cable tie of claim 1, wherein the composition further comprises a colorant.

10. The cable tie of claim 1, wherein the metallic barb material comprises stainless steel, and wherein the barb further comprises a first metallic barb and a second metallic barb.

11. A device for bundling a plurality of elongate members in parallel relation, the device comprising:
    a body having a composition wherein the composition includes:
        a base plastic,
        an antimicrobial additive comprising a complex of zinc and copper, and configured to be effective against silver ion resistant pathogens,
            wherein the antimicrobial additive does not include zinc pyrithione, a detectable metal additive, and
        an X-ray detectable additive; and
    a head integrally connected to the body;

wherein the head includes a barb comprising a metallic barb material for receiving an opposite end of the body in inverse frictional relation to bundle the plurality of elongate members.

12. The device of claim 11, wherein the antimicrobial additive comprises zinc oxide.

13. The device of claim 11, wherein the antimicrobial additive comprises between 0.1% to 30% of the composition.

14. The device of claim 13, wherein the antimicrobial additive comprises between 2% to 15% of the composition.

15. The device of claim 14, wherein the antimicrobial additive comprises between 2% to 5% of the composition.

16. The device of claim 11, wherein the metallic barb material comprises stainless steel, and wherein the barb further comprises a first metallic barb and a second metallic barb.

17. The device of claim 11, wherein the base plastic is polyamide, polypropylene, polycarbonate, poly(ethylene tetrafluoroethylene), polyetheretherketone, poly(ethylene and chlorotrifluoroethylene), polyvinyl chloride, or a combination thereof.

18. The device of claim 11, wherein the detectable metal additive comprises between 0.3% to 25% by weight of the composition, and wherein the X-ray detectable additive comprises between 0.5% to 15% by weight of the composition.

* * * * *